(12) United States Patent
Hilbish

(10) Patent No.: US 8,741,443 B2
(45) Date of Patent: Jun. 3, 2014

(54) DISPOSABLE FOOD TRAY

(75) Inventor: Joseph Miller Hilbish, Cornelius, NC (US)

(73) Assignee: Powertray, LLC, Mocksville, NC (US)

( * ) Notice: Subject to any disclaimer, the term of this patent is extended or adjusted under 35 U.S.C. 154(b) by 213 days.

(21) Appl. No.: 13/110,561

(22) Filed: May 18, 2011

(65) Prior Publication Data

US 2012/0292226 A1   Nov. 22, 2012

(51) Int. Cl.
B32B 23/04 (2006.01)
(52) U.S. Cl.
USPC .......... 428/532; 428/537.5; 428/34.2
(58) Field of Classification Search
USPC .................... 428/532, 537.5, 34.2
See application file for complete search history.

(56) References Cited

U.S. PATENT DOCUMENTS

| | | | |
|---|---|---|---|
| 3,366,303 A | 1/1968 | Kaspar | |
| 3,603,218 A | 9/1971 | Ludder | |
| 3,761,011 A | 9/1973 | Reifers et al. | |
| 4,055,670 A | 10/1977 | Belmont | |
| 4,491,502 A | 1/1985 | Martin, Jr. | |
| 5,116,649 A | 5/1992 | Massouda | |
| 5,154,982 A * | 10/1992 | Cessna | 428/537.5 |
| 5,176,930 A | 1/1993 | Kannankeril et al. | |
| 5,256,427 A | 10/1993 | Quick et al. | |
| 5,323,958 A | 6/1994 | Liu et al. | |
| 5,326,017 A | 7/1994 | Liu et al. | |
| 5,332,148 A | 7/1994 | Liu et al. | |
| 5,356,070 A | 10/1994 | Rigby | |
| 5,506,036 A | 4/1996 | Bergerioux | |
| 5,506,046 A | 4/1996 | Andersen et al. | |
| 5,508,072 A | 4/1996 | Andersen et al. | |
| 5,514,430 A | 5/1996 | Andersen et al. | |
| 5,520,970 A * | 5/1996 | Christensson et al. | 428/34.2 |
| 5,545,450 A | 8/1996 | Andersen et al. | |
| 5,582,670 A | 12/1996 | Andersen et al. | |
| 5,603,996 A | 2/1997 | Overcash et al. | |
| 5,631,053 A | 5/1997 | Andersen et al. | |
| 5,660,903 A | 8/1997 | Andersen et al. | |
| 5,665,439 A | 9/1997 | Andersen et al. | |
| 5,665,442 A | 9/1997 | Andersen et al. | |
| 5,679,145 A | 10/1997 | Andersen et al. | |
| 5,683,772 A | 11/1997 | Andersen et al. | |
| 5,691,014 A | 11/1997 | Andersen et al. | |
| 5,700,516 A | 12/1997 | Sandvick et al. | |
| 5,702,787 A | 12/1997 | Andersen et al. | |
| 5,705,238 A | 1/1998 | Andersen et al. | |
| 5,709,827 A | 1/1998 | Andersen et al. | |
| 5,709,897 A | 1/1998 | Pearlstein | |
| 5,736,209 A | 4/1998 | Andersen et al. | |
| 5,800,647 A | 9/1998 | Andersen et al. | |
| 5,810,961 A | 9/1998 | Andersen et al. | |
| 5,830,548 A | 11/1998 | Andersen et al. | |
| 5,851,634 A | 12/1998 | Andersen et al. | |
| 5,863,388 A * | 1/1999 | Yeh et al. | 162/231 |
| 5,928,741 A | 7/1999 | Andersen et al. | |
| 6,090,195 A | 7/2000 | Andersen et al. | |
| 6,207,242 B1 | 3/2001 | Hoffman | |
| 6,216,855 B1 | 4/2001 | Grone | |
| 6,221,212 B1 | 4/2001 | Sjostrom | |
| 6,451,444 B1 | 9/2002 | Ollila et al. | |
| 6,491,214 B2 | 12/2002 | Plummer et al. | |
| 6,531,196 B1 | 3/2003 | Aho et al. | |
| 6,651,874 B1 | 11/2003 | Pedersen | |
| 6,663,925 B1 | 12/2003 | Swoboda | |
| 6,703,140 B2 | 3/2004 | Ayestaran | |
| 6,720,046 B2 | 4/2004 | Schwartz et al. | |
| 6,878,199 B2 | 4/2005 | Bowden et al. | |
| 6,893,693 B2 | 5/2005 | Swoboda et al. | |
| 6,919,111 B2 | 7/2005 | Swoboda et al. | |
| 6,929,111 B2 | 8/2005 | Rovers | |
| 6,974,612 B1 | 12/2005 | Frisk et al. | |
| 7,108,765 B2 | 9/2006 | Halabisky | |
| 7,144,632 B2 | 12/2006 | Hayes | |
| 7,229,678 B2 | 6/2007 | Reighard et al. | |
| 7,320,825 B2 | 1/2008 | Morabito | |
| 7,429,309 B2 | 9/2008 | Propst, Jr. et al. | |
| 7,435,483 B2 | 10/2008 | Lee et al. | |
| 2002/0012759 A1 | 1/2002 | Asayama et al. | |
| 2003/0091761 A1 | 5/2003 | Babcock et al. | |
| 2006/0110498 A1 | 5/2006 | Dellinger et al. | |
| 2008/0314536 A1 | 12/2008 | Peng et al. | |
| 2011/0065556 A1 | 3/2011 | Middleton et al. | |

FOREIGN PATENT DOCUMENTS

| | | |
|---|---|---|
| WO | WO 99/53810 | 10/1999 |
| WO | WO 2006/057662 | 6/2006 |
| WO | WO 2008/066487 | 6/2008 |

OTHER PUBLICATIONS

ISR PCT/US12/36924, Sep. 27, 2012.
KapStone—Kraft Paper—http://www.kapstonepaper.com/code/kpkp.htm, Feb. 9, 2011.
*What is the difference between softwood and hardwood*, Yahoo Answers, http://uk.answers.yahoo.com/question/index?qid=20081109141311AAIVCt2 Feb. 9, 2011.
*Aqueous Acrylic-Polyurethane Hybrid Dispersions and Their Use in Industrial Coatings*, High Beam Research, http://www.highbeam.com/doc/1G1-18901100.html, Feb. 10, 2011.
*Nestle Replaces CPET with paperboard for Stouffer's Trays*, Greener Package, http://www.greeenerpackage.com/trays/neslte_replaces_cpet_paperboard _stouffers trays Feb. 11, 2011.
*Paper and Paperboard Products*, Unites States Environmental Protection Agency.
Peerless M37T/M407 Plate & Tray Forming Machine, Peerless Machine & Tool Corporation Marion, Indiana—peerless@peerlessmachine.com.

* cited by examiner

*Primary Examiner* — Leszek Kiliman

(74) *Attorney, Agent, or Firm* — Shumaker, Loop & Kendrick, LLP

(57) ABSTRACT

A repulpable and recyclable case ready food tray is disclosed for carrying various food items, such as meat, poultry and produce that is typically used for retail display. The food tray is formed from paperboard made from natural wood fiber that is coated to provide a waterproof food cavity for preventing leakage of liquid from the food item and a moisture proof exterior support surface which allows excess liquid to be released from the food tray during the manufacturing process while providing a moisture proof surface to prevent wicking of liquid into the food tray if the tray is placed on a wet surface.

21 Claims, 19 Drawing Sheets

SECTION H-H

SECTION I-I

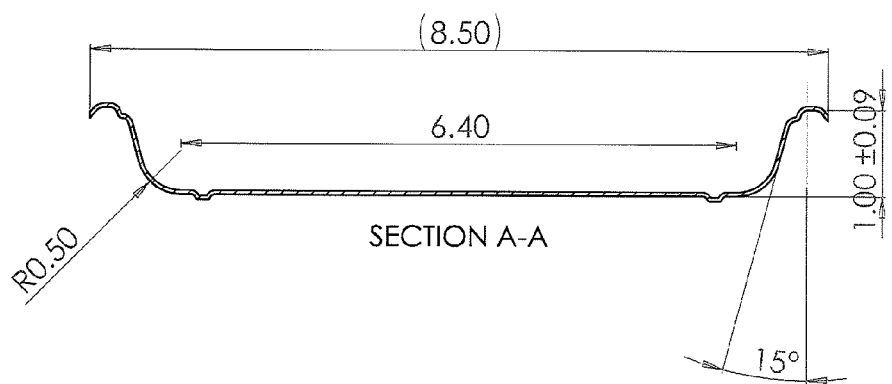
Fig. 7C
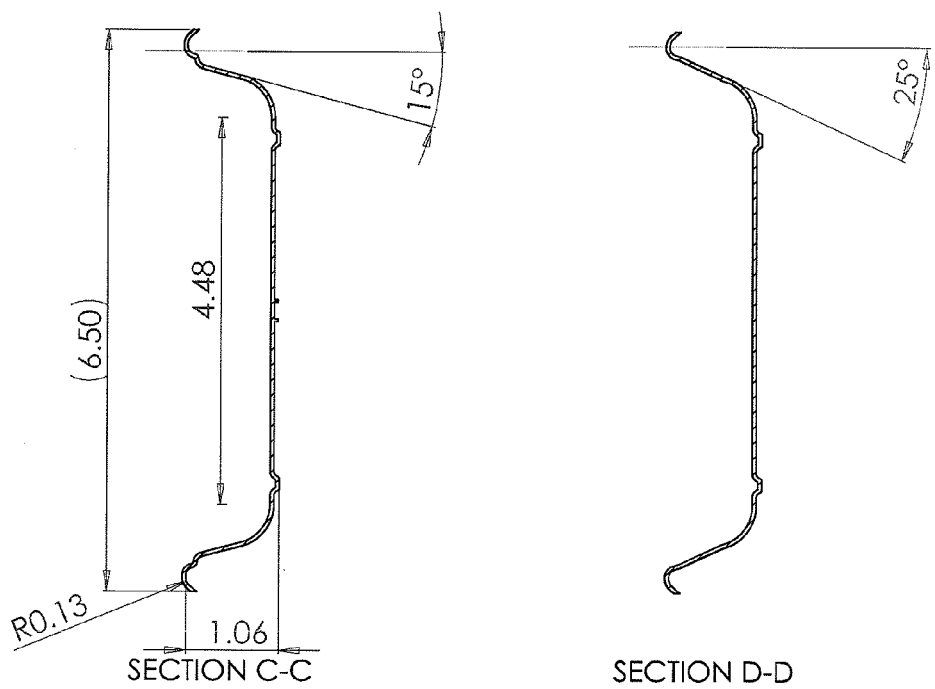
Fig. 7D  Fig. 7E

SECTION C-C

SECTION D-D

70

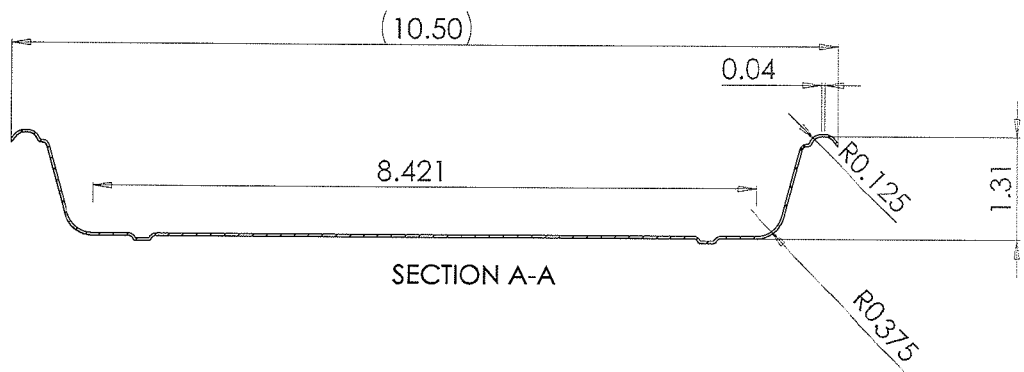
Fig. 9C
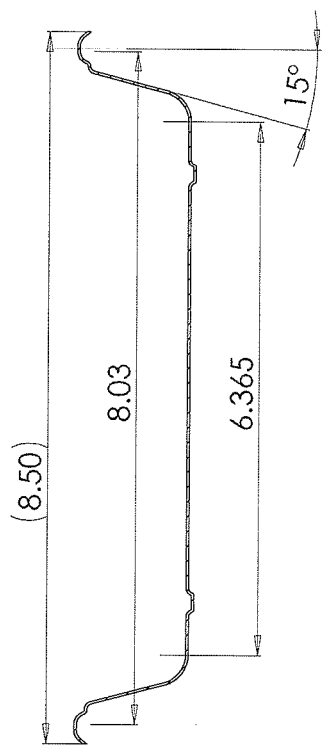 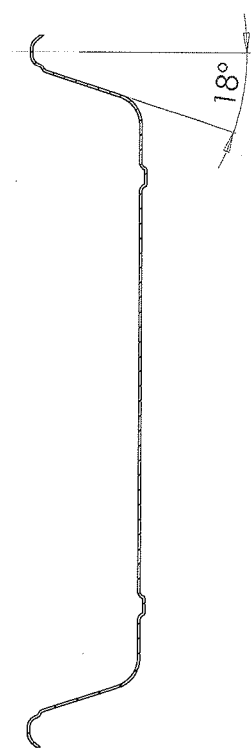
SECTION C-C    SECTION D-D
Fig. 9D    Fig. 9E

SECTION A-A

SECTION C-C

DISPOSABLE FOOD TRAY

BACKGROUND OF THE INVENTION

1. Field of the Invention

The present invention relates to a disposable case ready food tray that is repulpable and recyclable for carrying and shipping various food items, such as meat, poultry and produce, the food tray being formed from off-the-shelf paperboard made from natural wood fibers that is coated with a waterproof coating, for example, a polyethylene or polypropylene coating, to provide a waterproof food cavity that prevents leakage of liquid from the food item being absorbed by the food tray; the food tray also coated with a moisture resistant coating, for example, a water based acrylic coating, to provide a moisture resistant exterior support surface which prevents wicking of liquid into the food tray if the tray is placed on a wet surface and allows excess liquid to be released from the tray during the manufacturing process.

2. Description of the Prior Art

Various food trays are known in the art for carrying food items, such as meat, poultry and produce. Such food trays are normally wrapped with a transparent wrapping material in order to display the food item carried by the tray and placed on display in retail markets. In yet other applications, food trays are known to be used in "butcher shop" applications in which fresh cuts of meats that have been selected by a consumer are placed on a cardboard food tray and wrapped in "butcher paper". So called butcher paper is kraft paper that is used by butchers for the purpose of wrapping meat and fish and is resistant to blood and meat fluids.

Some known food trays are formed from expanded polystyrene, marketed as Styrofoam® by the Dow Chemical Company. Examples of food trays formed from polystyrene are disclosed in U.S. Pat. Nos. 4,899,925 and 5,050,791, for example. Although food trays formed from polystyrene have been used for years with acceptable results, there are various drawbacks to using food trays made from polystyrene. Probably the biggest drawback to the use of polystyrene is that it is not biodegradable. In fact, there is a growing trend by governmental entities to ban the use of polystyrene. For example, more than 100 US cities including Portland, San Francisco. Seattle and Honolulu, now ban the use of polystyrene trays in restaurants.

There are several reasons for the ban on the use of polystyrene. One reason relates to health concerns that toxic components of the polystyrene trays may leach into the food being carried by the tray. Another concern is that such polystyrene trays are not biodegradable and are thus placing a large burden on landfills. Unfortunately, it is unsafe to incinerate such trays. In particular, incineration of such trays is known to produce toxic gasses including carcinogens. As such, disposable of such polystyrene trays in landfills is the only viable option.

In order to solve this problem, food trays have been developed that are formed from paper board formed from natural biodegradable cellulose materials, such as cellulose hardwood and softwood fibers. Unfortunately, raw paper board, formed from natural wood fibers, has virtually no ability to prevent blood and other meat liquids from leaking through the food tray. As such, custom composite paper board materials which include one or more natural wood fiber materials and one or more waterproofing agents. The natural wood fiber material and the waterproofing agents are processed together to form a composite paperboard sheet that is waterproof and can be used as a food tray. For example, U.S. Pat. No. 5,154,982 discloses a composite paperboard sheet with waterproof properties that is amenable to being used as a food tray. In particular, the '982 patent discloses composite paperboard formed from 60%-80% virgin wood pulp, 20%-40% polyolefin synthetic pulp, 10%-15% clay and 1%-2% cationic dispersed rosin, processed in such a way that the polyolefin pulp and the cationic dispersed rosin fuse with the wood pulp and the clay to form a plasticized sheet of paper board that is essentially water proof. U.S. Pat. Nos. 5,154,982 and 5,863,388 also disclose composite paperboard materials that include waterproofing agents to enable the paperboard to be used in food tray applications. Unfortunately, the composite paper board with waterproofing agents is a custom paperboard and is thus relatively more expensive than ordinary paperboard without waterproofing Thus, there is a need to provide a food tray that is relatively less expensive to produce than known food trays and is also biodegradable.

SUMMARY OF THE INVENTION

Briefly, the present invention relates to a disposable case ready repulpable and recyclable paperboard food tray for carrying various food items, such as meat, poultry and produce ("food items") that can be used for shipping and retail display. The food tray in accordance with the present invention ("food tray") is formed from off-the-shelf paperboard made from natural wood fibers that is coated with a waterproof coating, for example, a polyethylene or polypropylene coating, to provide a waterproof food cavity for preventing leakage of liquid from the food item from being absorbed into the food tray. The exterior support surface is coated with a moisture resistant coating, for example, a water based acrylic coating, to form a moisture resistant exterior barrier to prevent wicking of liquid into the food tray if the tray is placed on a wet surface. In accordance with an important aspect of the invention, the food tray is formed from multiple laminated layers of off-the-shelf virgin kraft paperboard, formed from natural cellulose wood fibers. One layer of the paper board is coated with a water proof agent to provide a waterproof food cavity. A bottom surface of the food tray is treated with a moisture proof coating that prevents wicking of liquid into the food tray if the tray is placed on a wet surface and allows any excess liquid to be purged from the laminated paperboard. By incorporating the coatings into the tray forming process and using off-the-shelf virgin kraft paper board as a starting point, the overall cost of the food tray is greatly reduced relative to known biodegradable food trays.

DESCRIPTION OF THE DRAWING

These and other advantages of the present invention will be readily understood with reference to the following specification and attached drawing wherein:

FIGS. 7A-7E are exemplary drawings of a 21.4 fluid ounce food tray in accordance with the present invention.

FIGS. 9A-9E are exemplary drawings of an alternative 64.7 fluid ounce food tray in accordance with the present invention.

DETAILED DESCRIPTION

The present invention relates to a disposable repulpable and recyclable case ready paperboard food tray for carrying various food items, such as meat, poultry and produce, that is typically used for shipping and retail display, The food tray in accordance with the present invention is formed from laminated paperboard from multiple layers of off-the-shelf paperboard made from natural wood fiber. A waterproof coating is applied to one of the layers to provide a waterproof food cavity to prevent leakage of liquid from the food item from being absorbed by the food tray. The bottom surface is coated with a moisture proof coating to provide a moisture proof exterior support surface which allows excess liquid to be released from the food tray during the manufacturing process while providing a moisture proof surface to prevent wicking of liquid into the food tray if the tray is placed on a wet surface.

As used herein, the term biodegradable means at least partially biodegradable. In particular, as will be discussed in more detail below, the food tray in accordance with is formed from natural cellulose wood fibers, which are biodegradable. As mentioned above, biodegradable food tray is provided with certain properties that are not inherent in natural wood fibers. These properties are provided by coatings that may not be biodegradable. However, such coatings only comprise less than 5% of the total weight of the food tray per inch. Even though the trays include such coatings, the food trays meet ASTM Specification 6868 for recyclability. Moreover, the food tray is biodegradable, recyclable and repulpable. Compared to the known polystyrene food trays which are not biodegradable, not recyclable and not repulpable, the food trays in accordance with the present invention represent a drastic improvement in the category of environmental friendly materials.

Figure 1:
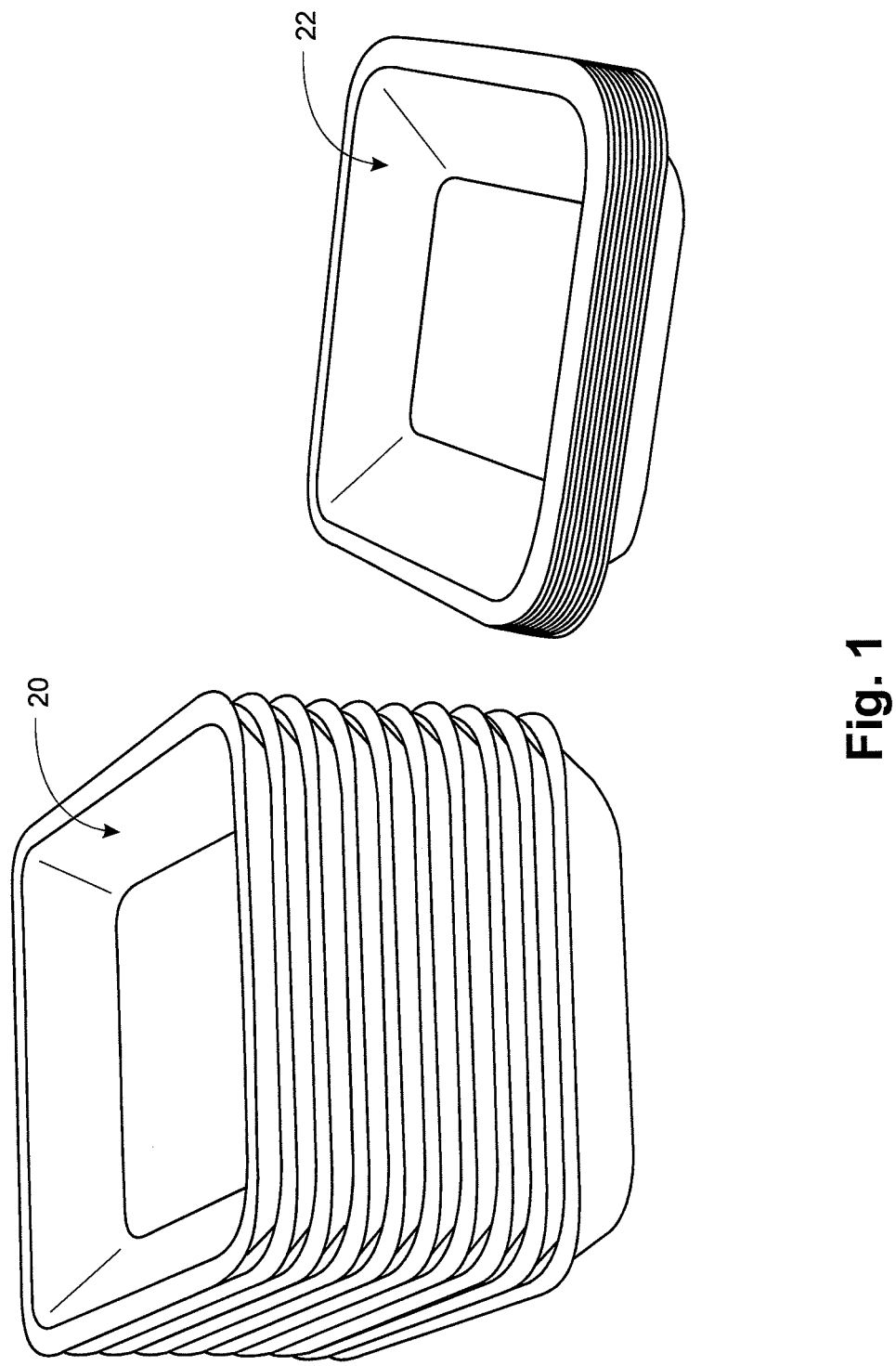
FIG. 1 is a perspective view illustrating a stack of known #3P polystyrene food trays side by side with a stack of an equal number of #3P coated and laminated paperboard food trays in accordance with the present invention.

In addition to being repulpable and recyclable, the food tray according to the present invention provides many benefits relative to known polystyrene food trays. For example, as illustrated in FIG. 1, the profile of the coated and laminated paperboard food tray in accordance with the present invention has a significantly smaller volume than such polystyrene food trays. In particular, FIG. 1 illustrates a stack of ten (10) polystyrene food trays, identified with the reference numeral 20, and a stack of an equal number of coated and laminated paperboard food trays 22 in accordance with the present invention. Referring to FIG. 1, the polystyrene food trays illustrated on the left portion of FIG. 1, have a much larger profile and consequently occupy a much larger volume than the paperboard food trays in accordance with the present invention, illustrated on the right portion of FIG. 1. As such, the cost of packaging and transporting the food trays is significantly reduced since more food trays 22 can be stored in a smaller volume than an equivalent number of known polystyrene trays.

As mentioned above, the food tray 22 is configured to be utilized in applications for carrying various food items, such as meat poultry and produce. As such, the paperboard and the coatings used to form the food tray are selected to be FDA compliant and meet 21 CFR, Parts 170-189. Moreover, the food trays 22 can be used in applications in which the food tray is covered with a cover, such as, shrink wrap film, overwrap or covered with a lid and in frozen or chilled food applications. As such, the food tray 22 is formed with sufficient rigidity to enable food tray and the food item to be covered and vacuum sealed with overwrap, for example, by way of an Ossid Model 400E overwrap machine, to enable the food item to be suitably frozen for later use by a consumer.

Figure 2:
FIG. 2 is a perspective view of a couple of food trays in accordance with the present invention, shown upside down in order to illustrate that advertising or other material can be printed directly on the food tray.

Another important aspect of the invention relates to the ability to fabricate food trays in different colors and the ability to print directly on the food tray itself, as generally illustrated in FIG. 2. Specifically, virtually any U>S>Food and Drug Administration (FDA) compliant color pigments can be added to the coatings, discussed below, to provide an overall color to the food tray. In addition, the food trays lend themselves to direct printing, for example, by way of known flexographic printing methods. As such, nutrition information, as well as marketing information can be directly printed on the exterior of the food tray, for example, as illustrated in FIG. 2.

Figure 3B:
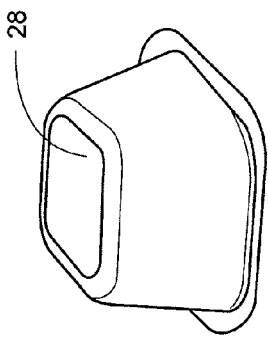
FIGS. 3A-3F are perspective views of various configurations of the food tray in accordance with the present invention.
Figure 3A:
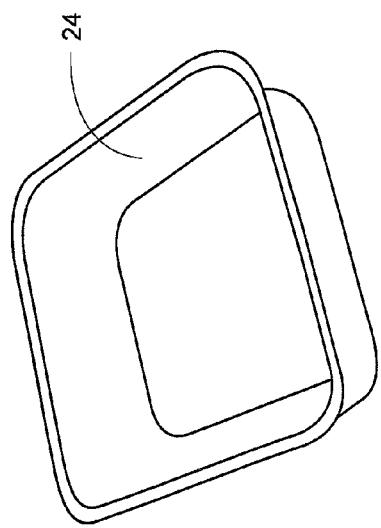
Figure 3C:
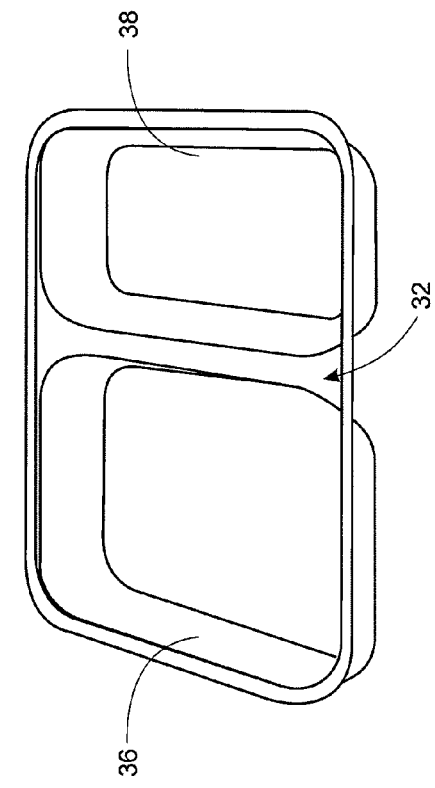
Figure 3F:
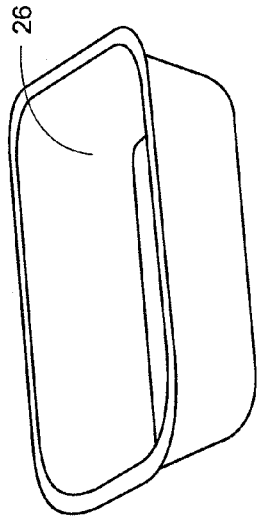
Figure 3E:
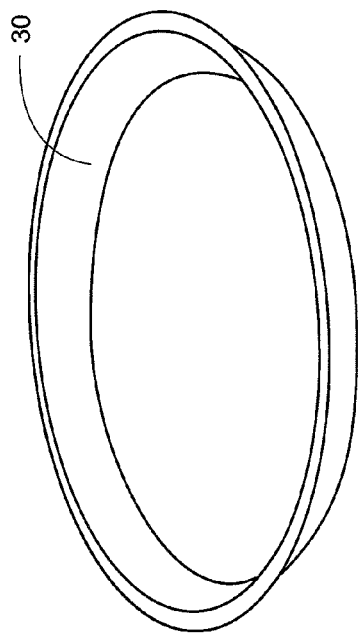
Figure 3D:
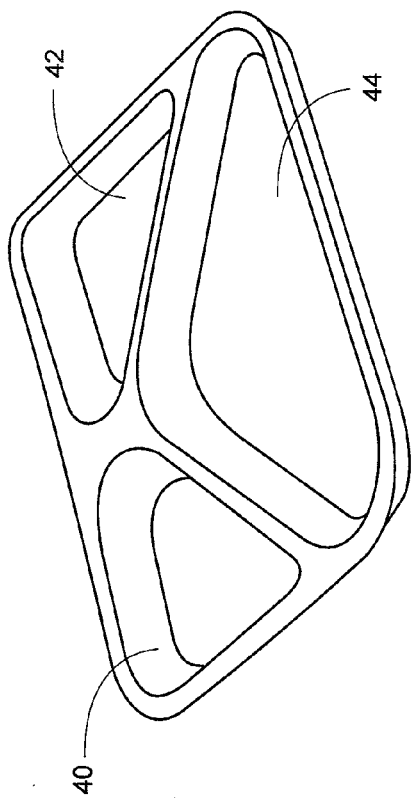

As shown in FIGS. 3A-3F, the food tray can be formed in various exemplary sizes and shapes. For example, FIGS. 3A and 3F illustrate food trays 24 and 26 formed in a rectangular shape. FIG. 3B illustrates a food tray 28 formed in a square shape, while FIG. 3E illustrates a food tray 30 formed in a circular shape. FIGS. 3A, 3B and 3F illustrate single compartment food trays while FIGS. 3C and 3D illustrate food trays 32 and 34, respectively with multiple compartments. More particularly, FIG. 3C illustrates the food tray with two generally rectangular compartments 36 and 38, which may be the same size or have different sizes. FIG. 3D illustrates the food tray 34 with more than two compartments, for example, the compartments 40, 42 and 44. These compartments 40, 42 and 44 may be generally triangular in shape and be formed with the same size or different sizes. The principles of the present invention are applicable to virtually any shape of food tray, such as a polygonal, triangular or irregular shape. In addition, the principles of the present invention are applicable to food trays formed with a single compartment or multiple compartments having the same size or shape or different sizes and shapes or a combination thereof. However, multi-compartment food trays are formed from single ply Solid Bleached Sulfate (SBS) tray board having a thickness of up to 24 microns and coated on both sides as discussed herein.

Figure 4:
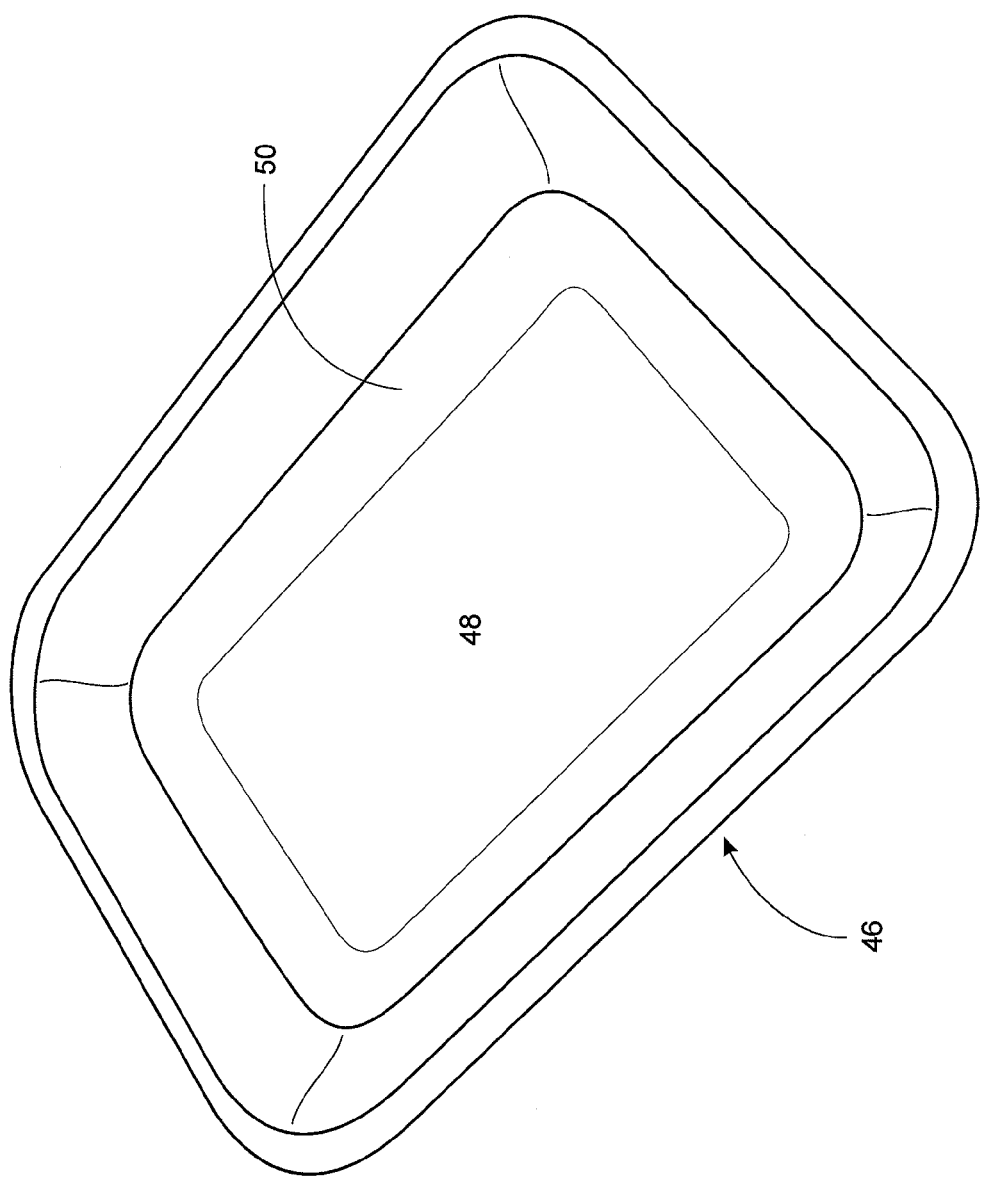
FIG. 4 is a partial perspective view of one embodiment of a food tray in accordance with the present invention.
Figure 5:
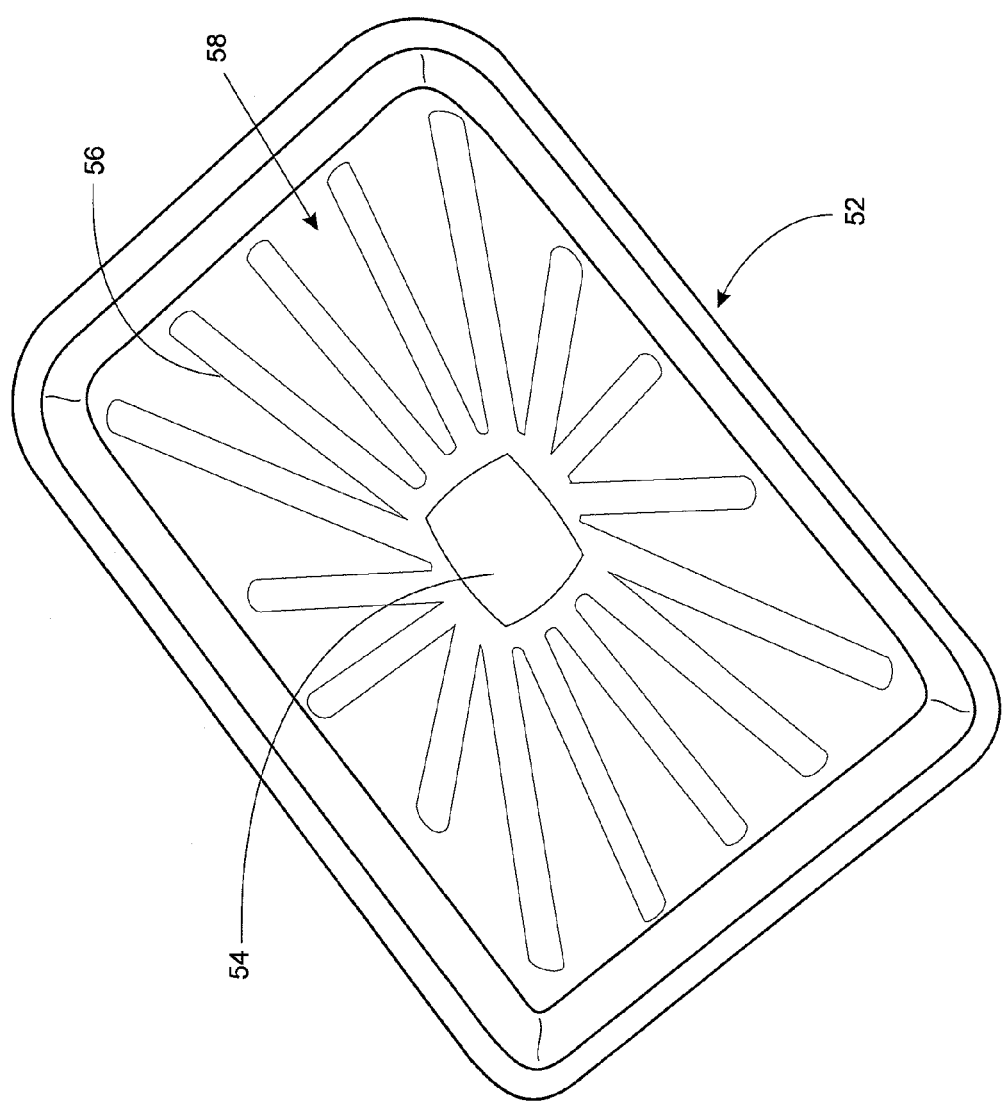
FIG. 5 is a partial perspective view of another embodiment of a food tray in accordance with the present invention.
Figure 6A:
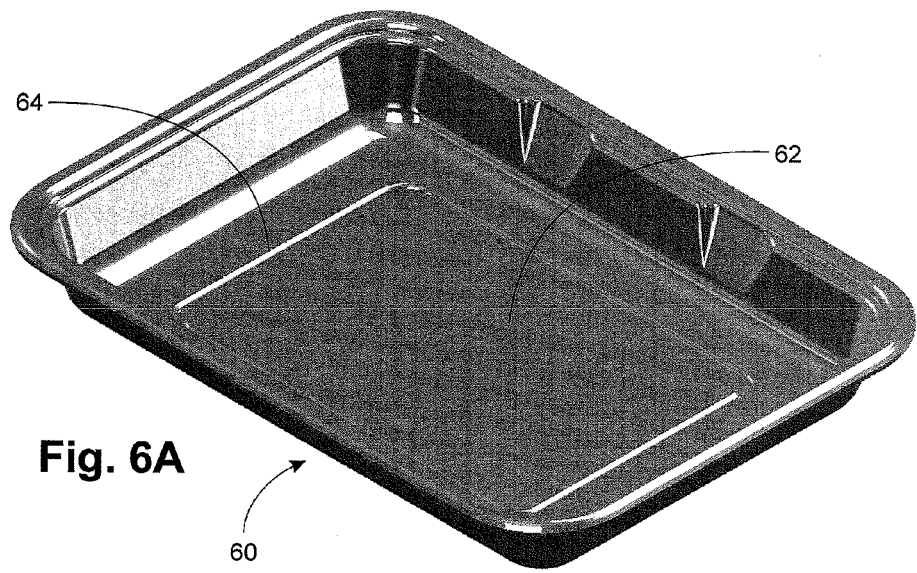
FIGS. 6A-6E are exemplary drawings of a 33 fluid ounce food tray in accordance with the present invention.
Figure 6B:
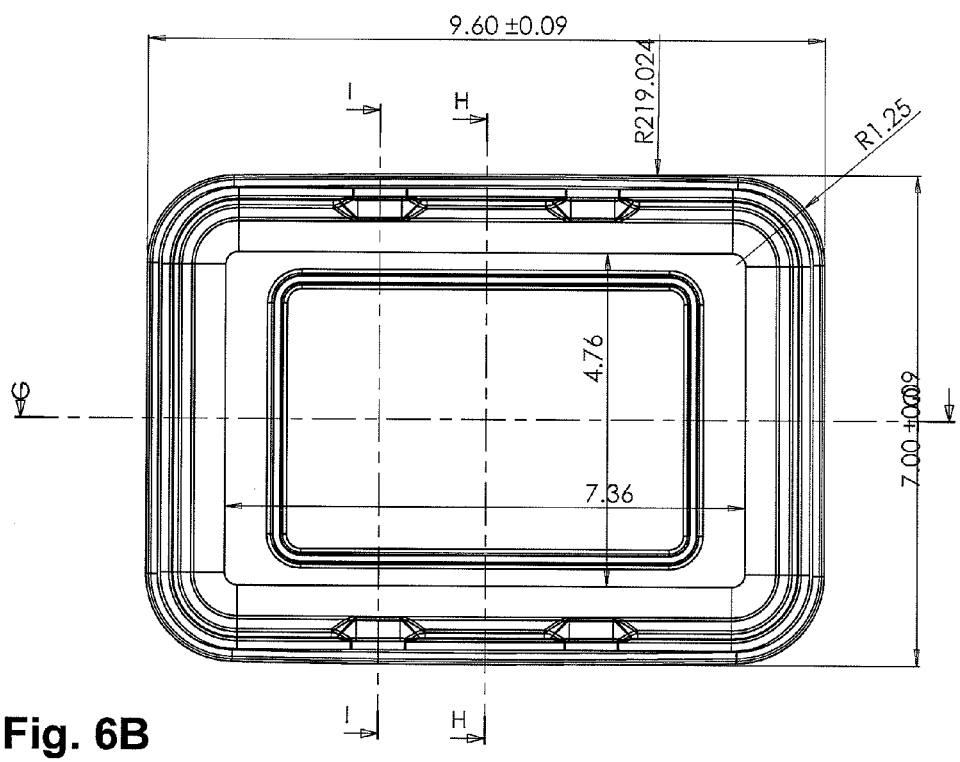
Figure 6C:
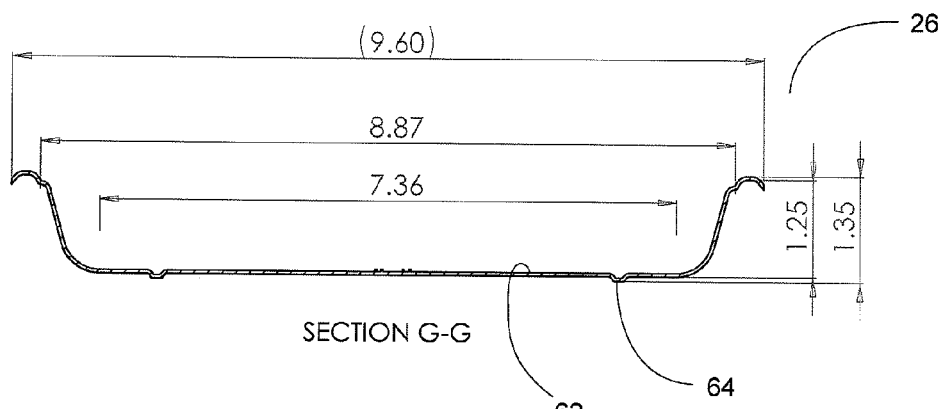
Figure 6D:
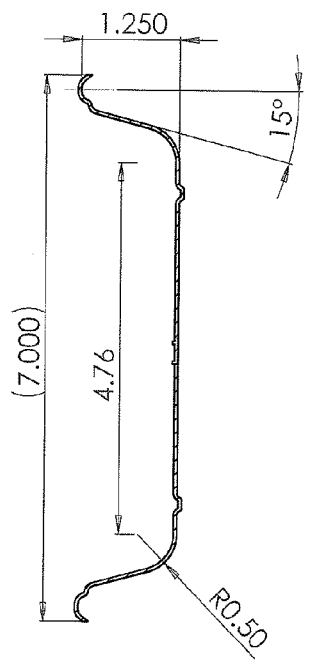
Figure 6E:
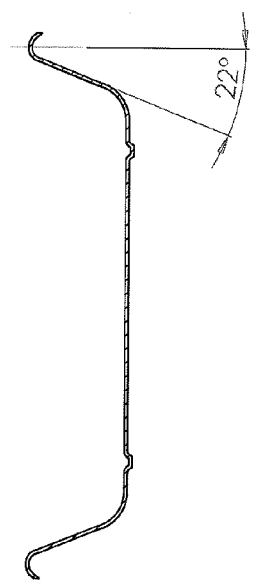
Figure 7A:
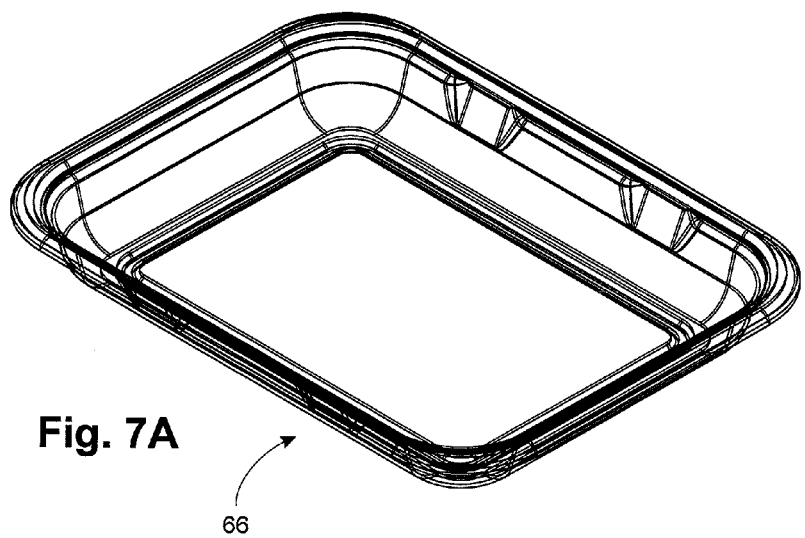
Figure 7B:
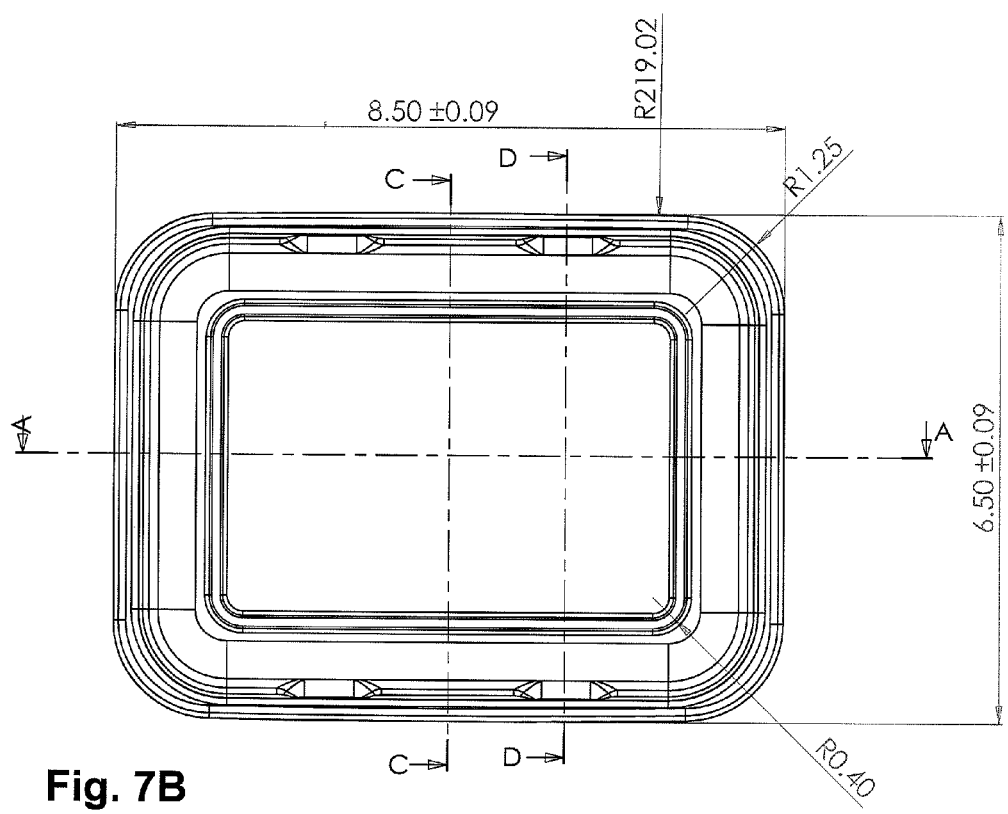
Figure 8A:
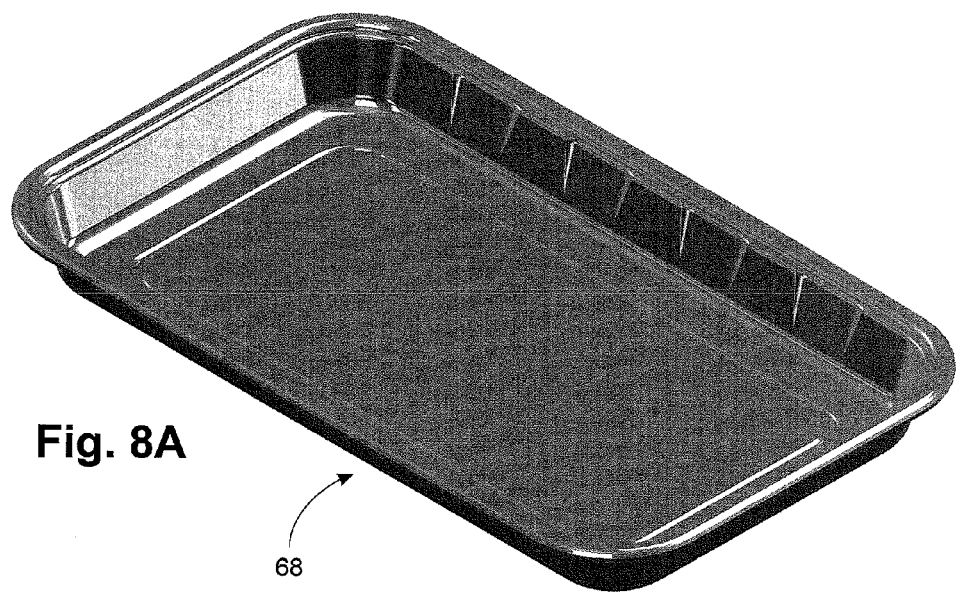
FIGS. 8A-8E are exemplary drawings of a 64.7 fluid ounce food tray in accordance with the present invention.
Figure 8B:
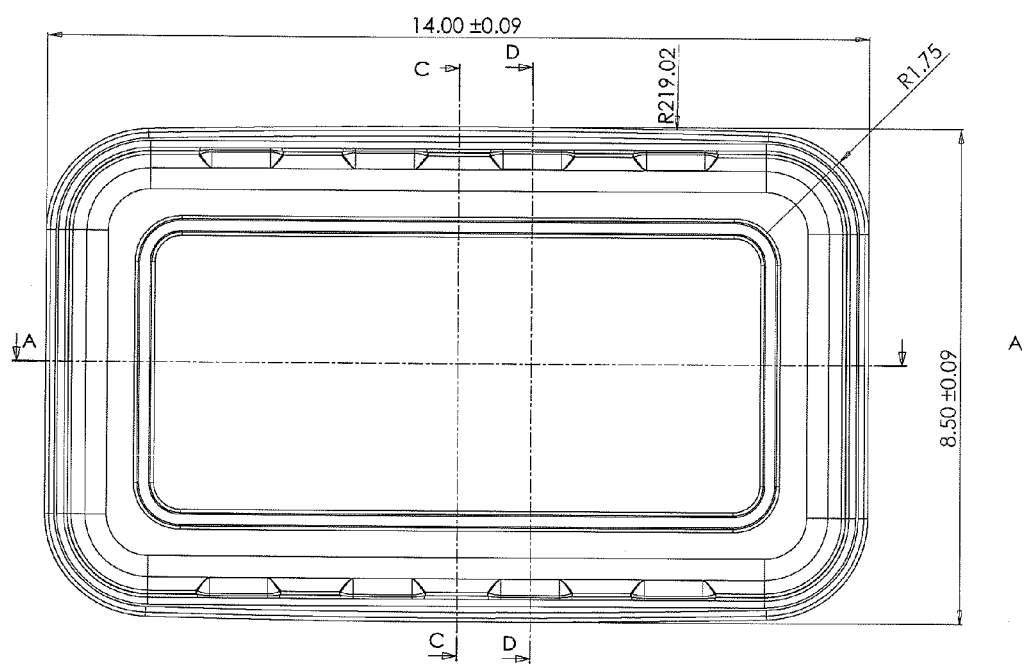
Figure 8C:
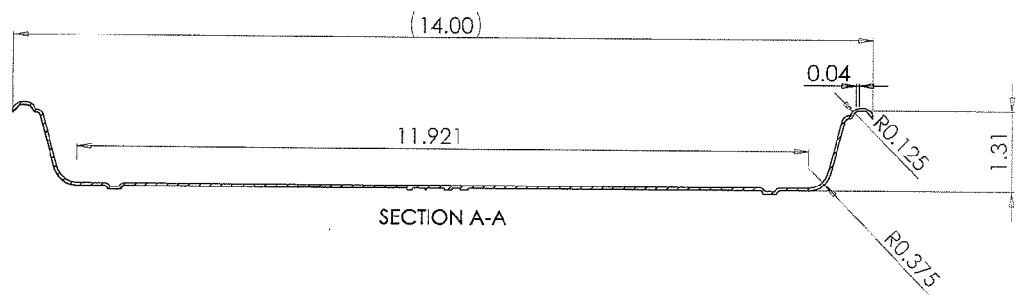
Figure 8D:
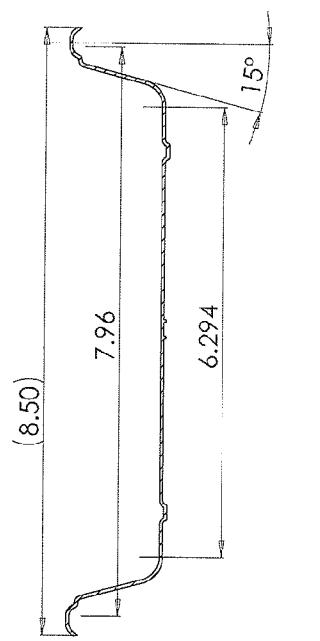
Figure 8E:
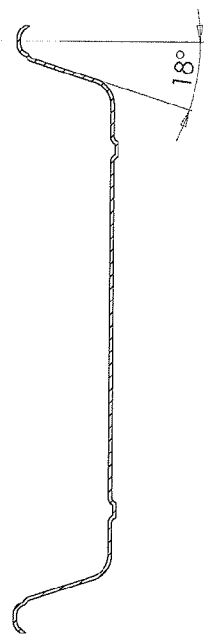
Figure 9A:
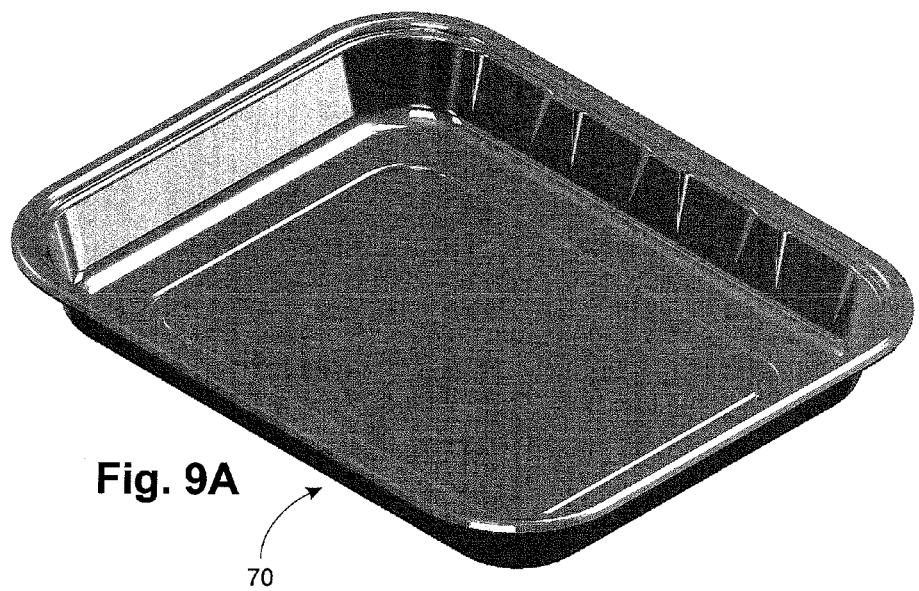
Figure 9B:
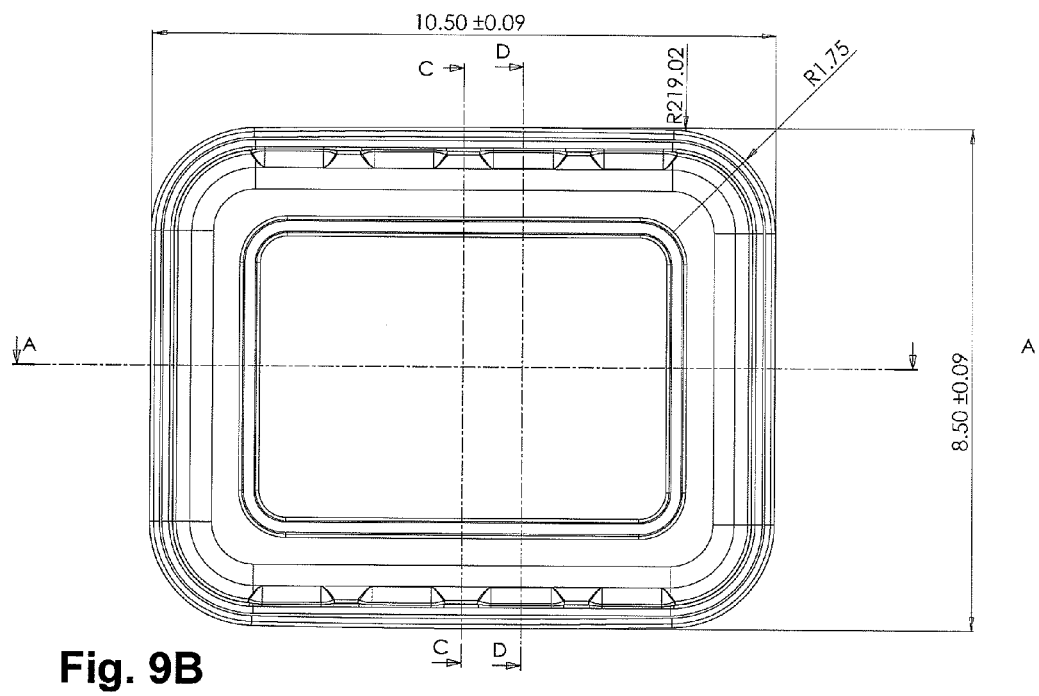
Figure 10A:
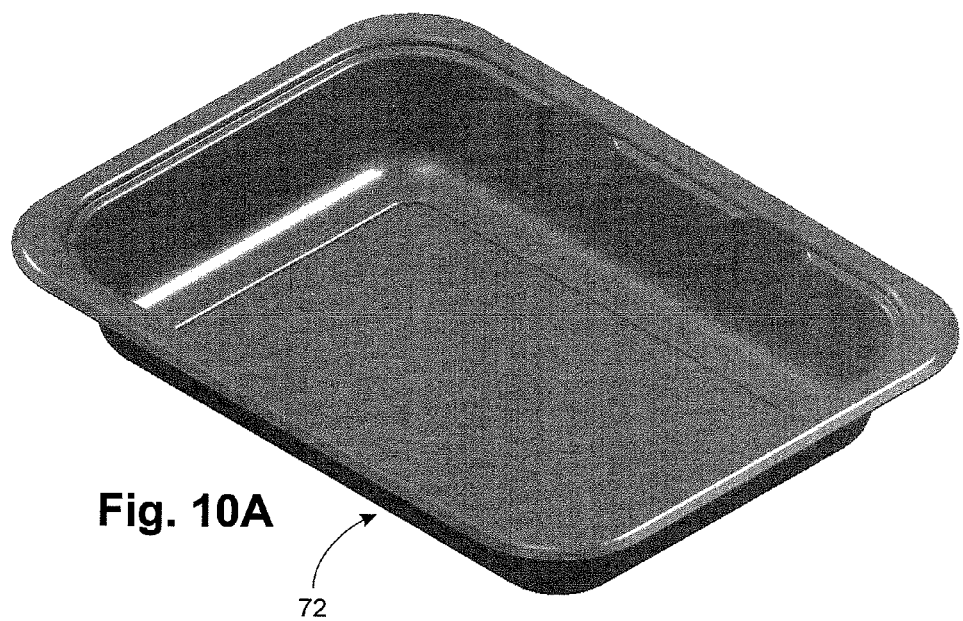
FIGS. 10A-10D are exemplary drawings of a 37.5 fluid ounce food tray in accordance with the present invention.
Figure 10B:
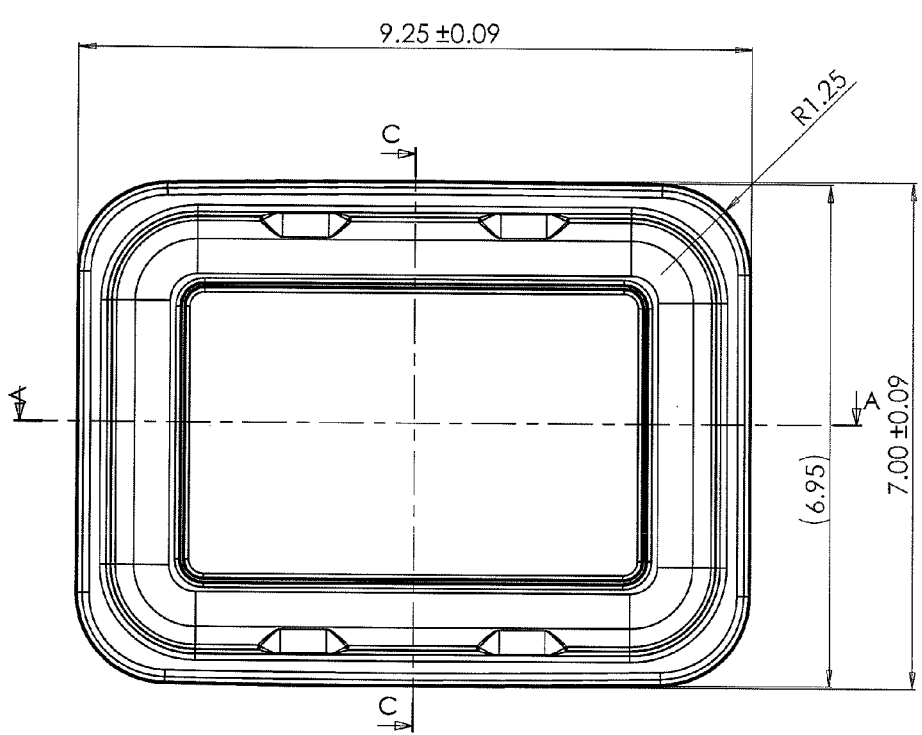
Figure 10C:
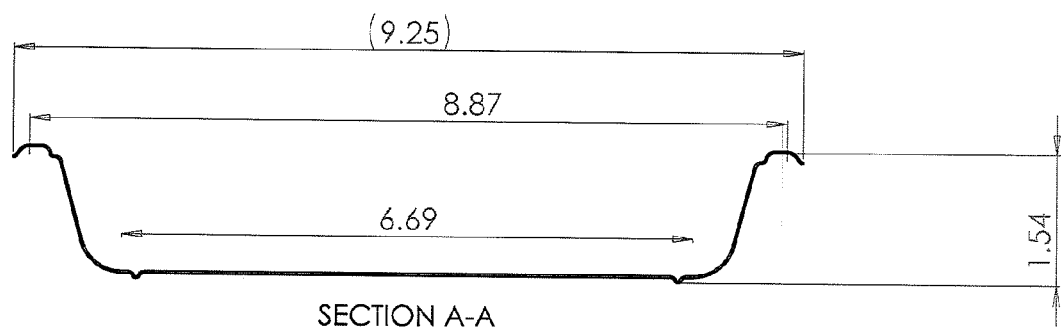
Figure 10D:
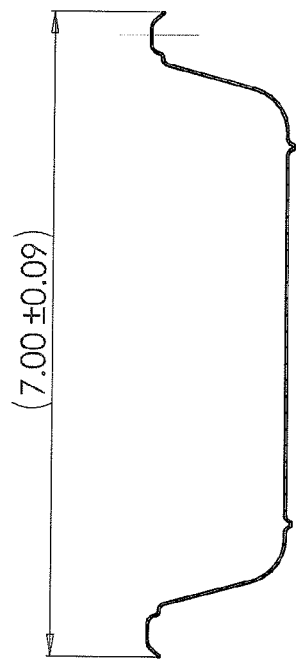

FIGS. 4 and 5 illustrate different configurations of the interior floor of a food tray in accordance with the present invention. In particular, FIG. 4 illustrates a food tray 46 with a raised floor panel 48. A trough 50 surrounds the raised floor panel 48. The food item (not shown) is placed on the raised floor panel 48. Any liquid that drains from the food item is directed away from the food item and into the trough 50. The food tray 52 illustrated in FIG. 5 includes a centrally located raised panel 54 and a number of raised ribs, generally identified with the reference numeral 56, emanating from the centrally located raised panel 54. In this embodiment, the food item is supported on top of the centrally located raised panel 54 and the raised ribs 56. Liquid that drains from the food item is directed away from the food item and is maintained in cavities, generally identified by the reference numeral 58, between adjacent ribs 56. Other configurations of the interior floor are also within the broad scope of the invention.

The food trays 22 in accordance with the present invention are amenable to being formed in various sizes. For example, FIGS. 6A-10D illustrate various exemplary sizes of a generally rectangular food tray 60, formed with a centrally located floor panel 62. In particular, FIGS. 6A-6E are exemplary drawings of a 33 fluid ounce food tray 60. The food tray 60 may be formed from laminated paperboard, as described below having a thickness of 975 mils formed from a blank 9.566×12.159 inches. The food tray 60 is formed with a centrally located panel 62 defined by a trench 64 that circumscribes the centrally located panel 62.

The balance of the food trays 68-72 are similar. FIGS. 7A-7E are exemplary drawings of a 21.4 fluid ounce food tray 66, formed with a thickness of 684 mils from a blank 9.93×7.92 inches. FIGS. 8A-8E are exemplary drawings of a 64.7 fluid ounce food tray 68, formed with a thickness of 1914 mils from a blank 15.93×10.44 inches. FIGS. 9A-9E are exemplary drawings of an alternative 64.7 fluid ounce food tray 70, formed with a thickness of 1914 mils from a blank 12.44×10.44 inches. Finally, FIGS. 10A-10D are exemplary drawings of a 37.5 fluid ounce food tray 72. formed with a thickness of 1110 mils from a blank 11.5×9.25 inches. The configurations illustrated in FIGS. 6A-10D are merely exemplary. Other configurations are within the broad scope of the invention.

Figure 11:
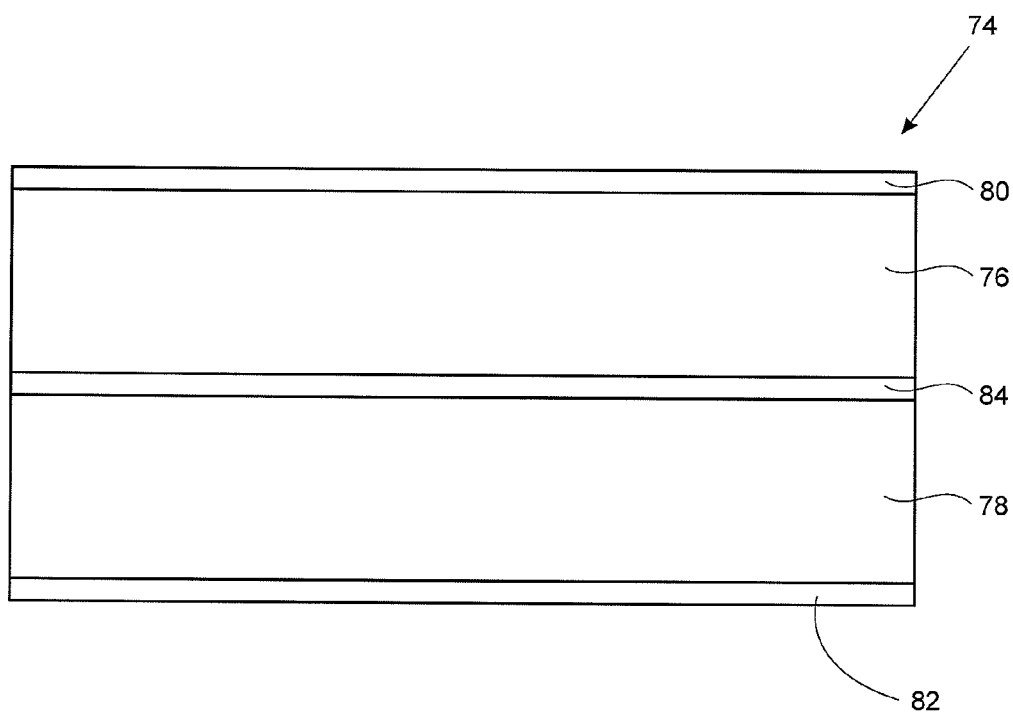
FIG. 11 is an exemplary section view of a food tray in accordance with the present invention.

FIG. 11 is a sectional view of the laminated paperboard, generally identified with the reference numeral 74, used to make the food trays in accordance with the present invention. A first layer 76 and a second layer 78 of paperboard are illustrated in FIG. 11. However, the principles of the invention are applicable to embodiments having more than two (2) layers of paperboard. The additional layer(s) of paperboard are used to provide additional strength.

Various off-the-shelf types of paperboard are suitable for the food trays in accordance with the invention. In particular, suitable paperboard includes paperboard formed from natural wood fibers including hardwood fiber, softwood fiber or a combination of the two. Moreover, the different layers 74, 76 of the paperboard 74 can have the same or different compositions of wood fiber. Each layer 74, 76 of paperboard is, for example, an FDA compliant virgin kraft paperboard, for example, 94% to 96% of the overall basis weight of the food tray and 136 to 152 pounds of material per one thousand square feet of area (MSF). The composition of the paperboard may be, for example, hardwood (15%), softwood (85%) for each layer 76,78 of the paperboard 74. Paperboard suitable for one or both of the layers 76, 78 of the laminated paperboard 74 is an uncoated unbleached kraft paperboard. Such paperboard is available off-the-shelf from the Kapstone Paper Company in North Charleston, S.C. under the trade name Kraftpak.

For an embodiment with two (2) layers, one of the layers 76 is coated with waterproof coating 80 to form a waterproof barrier. The waterproof coating 80 is disposed on one face of one of the paperboard layers 74, as generally shown in FIG. 11. Since the coating 80 will be in contact with the food item, the coating 80 is FDA compliant. Various waterproof coatings are suitable. For example, a polyethylene extrusion coating may be used having, for example, 2.9% to 3.3% of the overall basis weight of the tray or 4.4 pounds per MSF. Such an extrusion coating has a zero Cobb value and provides 100% water and grease absorption protection. Other waterproof coatings are also suitable.

In the example illustrated in FIG. 11, in order to increase the stiffness and strength of the paperboard, a second layer 78 of paperboard is laminated to the first layer 76 of paperboard. The second layer 78 of paperboard is coated with a moisture proof coating 82. As used herein, moisture proof means resistant to moisture but not waterproof. Various coatings are suitable for the moisture proof coating 84. For example, a water based acrylic aqueous coating is suitable that is from 1.4% to 1.5% of the overall basis weight of the tray or 2.3 pounds per MSF. Other coatings are also suitable.

As will be discussed in more detail below, the moisture proof coating 82 has a dual purpose. First, it provides a moisture proof barrier on the bottom of the food tray. Thus, if the food tray is placed on any wet surfaces, the moisture proof coating will prevent any wicking of the liquid into the food tray. Secondly, the coating allows excess water to be expelled from the paperboard while still providing the moisture resistant barrier. More particularly, as will be discussed in more detail below, off-the-shelf paperboard may not be pliable enough for further processing. As such, additional moisture is added to the paperboard during the coating and laminating processes. During the formation process of the tray, excess liquid/moisture is expelled from the paperboard using heat and pressure.

As described and illustrated herein, the two (2) layers 76 and 78 of paperboard are laminated together to be used to form the food trays in accordance with the present invention. However, the principles of the present invention are applicable to multiple ply paperboard having more than two (2) layers. An adhesive is used to bond the two (2) layers 76 and 78 (or more) together. Various adhesives are suitable. An exemplary adhesive suitable for use with the present invention is polyvinyl acetate adhesive which laminates the two or more plies of paperboard together that is from 1.4% to 1.5% of the overall basis weight or 2.3 pounds per MSF. Other adhesives are also suitable.

Figure 12A:
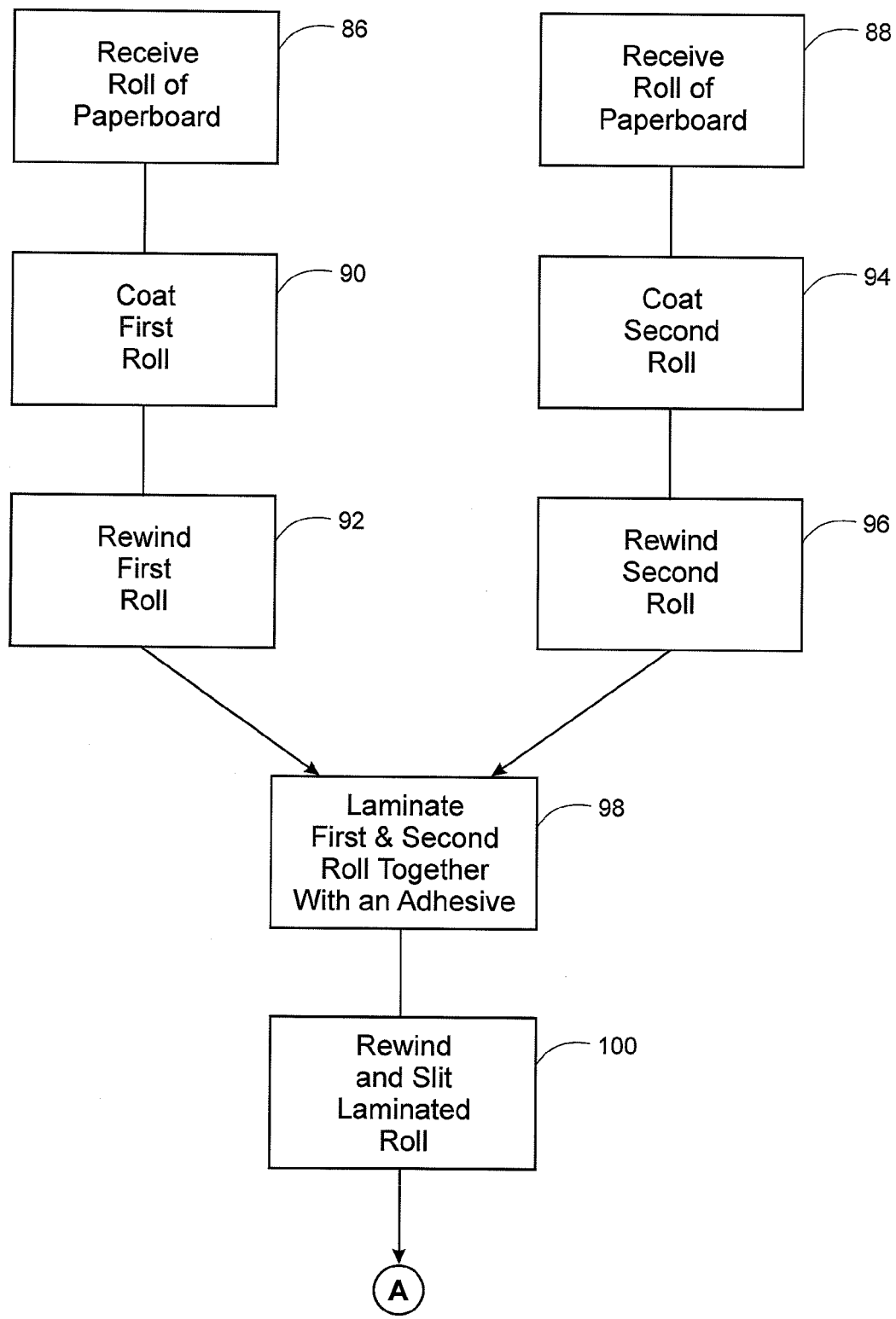
FIGS. 12A-12B are block diagrams illustrating the process steps involved in making a food tray in accordance with the present invention.
Figure 12B:
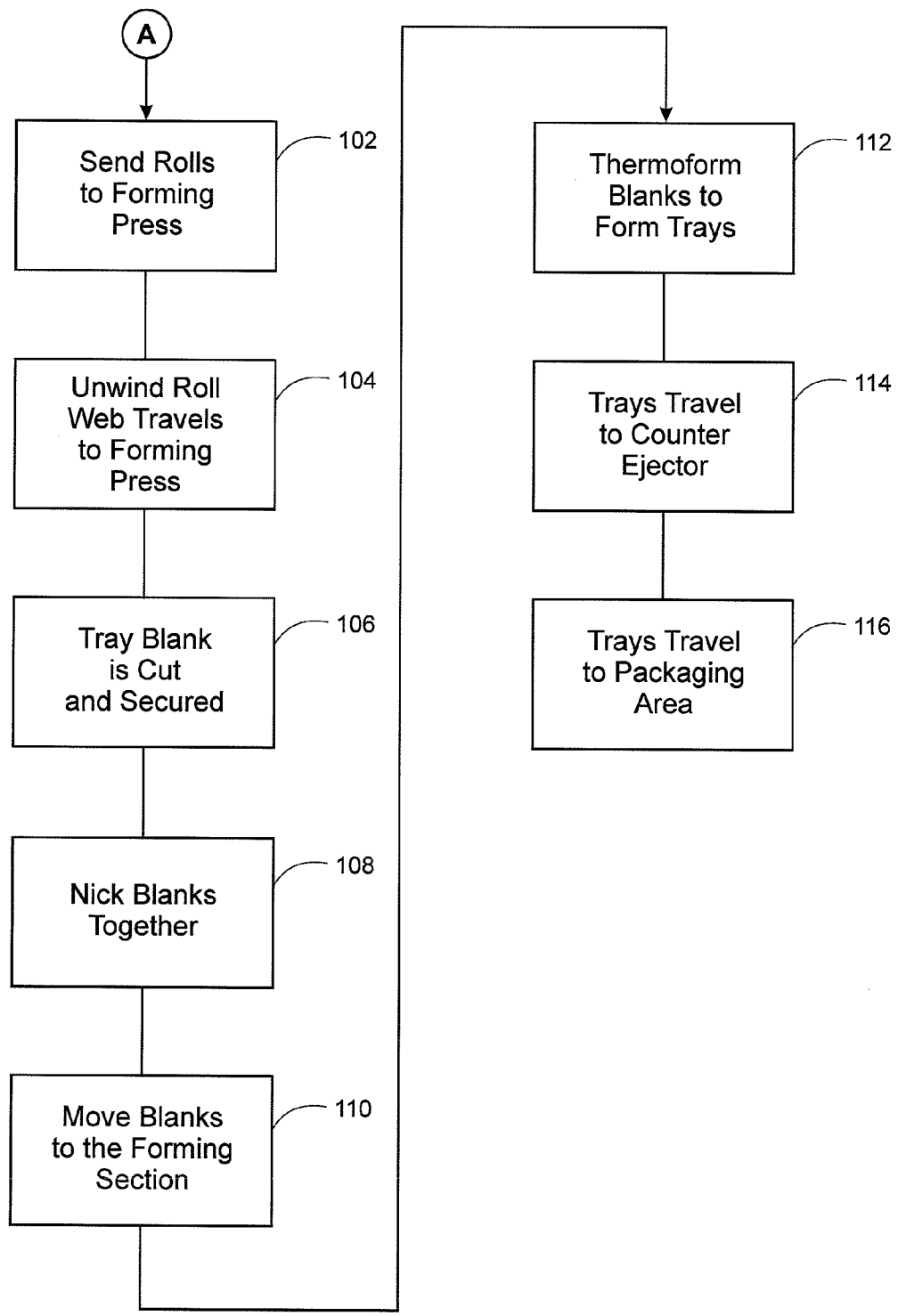

Referring to FIGS. 12A and 12B, a block diagram is shown that illustrates an exemplary manufacturing process for fabricating a food tray in accordance with the present invention from off-the-shelf paperboard. For an exemplary two layer embodiment, two rolls of off-the-shelf paperboard are received and processed separately as indicated by the blocks 86 and 88. As indicated above, the rolls of paperboard may be virgin kraft paperboard comprised of natural wood fibers. One roll, for example, the roll that is used to form the layer 76 (FIG. 11), is coated with a waterproof coating 80, as indicated by the block 90. For example, the layer 76 may be coated with an extruded polyethylene coating. Once the layer 76 is coated, it is rewound back into a roll, as indicated by the block 92 (FIG. 12). Similarly the other roll that forms the second layer 78 (FIG. 11) is coated with a moisture proof coating 82, as indicated by the block 94 and rewound into a roll by the block 96. The coatings may be applied to the rolls in a conventional manner.

The two (2) coated rolls are then mounted on a conventional laminator machine, as indicated in block 98. The laminator machine combines the two (2) rolls together to form paperboard with two (2) layers 76, 78, as discussed above. An adhesive 84 is used to combine the two layers 76, 78 together. Various conventional laminator machines are suitable. For example, a 98 inch wide Black Clawson or Schiavi extrusion coater laminator may be used. During the coating and laminating processes the natural paperboard moisture content of 6:5% may be increased in the laminated paperboard to make it more pliable. The moisture content may be increased, for example, to 13.0%. The coated and laminated paperboard is rewound and slit narrow width rolls up to 38 inches wide suitable for reforming, as indicated by the block 100.

The process steps above relate to forming multiple layer paperboard, suitable for use in fabricating food trays in accordance with the present invention. The steps described below relate to fabrication of a food tray.

As indicated by the block 102, the narrow width rolls of laminated paperboard are fed to a forming press, for example, a Model No. M40T Plate and Tray Forming Machine, available from the Peerless Machine and Tool Corporation, as described in detail in the Operator's Manual for the Peerless M37T/M40T Plate & Tray Forming Machine, hereby incorporated by reference. Other machines are also suitable.

The roll is unwound at the forming press, as indicated in step 104, and directed to a flatbed die cutting section of the machine where the tray blank is cut and scored. In terms of an M40T forming press, as described above, the die cutting platen is 20 inches (machine direction)×40 inches (cross direction). The laminated paperboard is stopped and food tray blanks are cut and scored in step 106. Dimensions for blanks for various exemplary food trays are provided above. The scoring is for the purpose of making the corners on rectangular food trays and for the curved edge on circular trays. Regular and embossed scores are also used for the platform of the tray and the flange. The blanks can be anywhere from two (2) to six (6) across, depending on the size. As indicated in step 108, the blanks are nicked together to secure their relative position to each other.

The blanks are then transported to the forming section in step 110. At the forming section, the laminated and die cut paperboard is thermoformed (pressed) with male/female hardened steel dies using heat and pressure to form the tray, as indicated by the block 112. The male, die typically has a temperature of approximately 320 degrees F., while the female die typically has a temperature of approximately 190 degrees F. The overall pressure on the forming press is approximately 160 tons.

For the purposes of the present invention, the term "thermoforming" refers to a method for preparing a shaped, formed, food tray from paperboard. The paperboard is typically heated to its melting or softening point, stretched over or into a temperature-controlled, single-surface mold and then held against the mold surface until cooled (solidified). The formed article, i.e. food tray, may then be trimmed from the thermoformed sheet. The trimmed material may be reground, mixed with virgin material, and reprocessed into usable sheet. Thermoforming may include vacuum forming, pressure forming, twin-sheet forming, drape forming, free blowing and simple sheet bending.

The thermoformed trays then travel to a counter ejector, as indicated by the block 114, where they are counted into stacks of, for example, 10 to 50 pieces and then travel by conveyor belt to the packaging area where they are bagged, boxed, and palletized, as indicated in step 116. The final thermoformed food trays can have a caliper (thickness) range of 40 to 56 microns.

Obviously, many modifications and variations of the present invention are possible in light of the above teachings. Thus, it is to be understood that, within the scope of the appended claims, the invention may be practiced otherwise than as specifically described above.

I claim:

1. A laminated paperboard for use in the fabrication of a food tray, the laminated paperboard comprising:
    a first layer of natural wood fiber paperboard having opposing faces;
    a waterproof coating applied to one of said opposing faces of said first layer;
    a second layer of natural wood fiber paperboard having opposing faces; and
    a moisture resistant coating applied to one of said opposing faces of said second layer; wherein:
    the first layer of natural wood fiber paperboard consists of natural wood fibers;
    said first layer and said second layer are laminated together; and
    the face of the first layer having the waterproof coating and the face of the second layer having the moisture resistant coating are the outermost surfaces of the laminated paperboard.

2. The laminated paperboard as recited in claim 1, wherein the composition of wood fiber in the first layer is the same as the composition of wood fiber in the second layer.

3. The laminated paperboard as recited in claim 1, wherein the composition of wood fiber in the first layer is different from the composition of wood fiber in the second layer.

4. The laminated paperboard as recited in claim 1, wherein the composition of wood fiber in one or the other of the first layer or second layer is a hardwood fiber.

5. The laminated paperboard as recited in claim 1, wherein the composition of wood fiber in one or the other of the first layer or second layer is softwood fiber.

6. The laminated paperboard as recited in claim 1, wherein the composition of wood fiber in one or the other of the first layer or second layer is a combination of a softwood fiber and a hardwood fiber.

7. A food tray comprising:
    a waterproof food cavity; and
    a moisture proof support surface, wherein said food tray is formed from a laminated paperboard, the laminated paperboard comprising:
    a first layer of natural wood fiber paperboard having opposing faces;
    a waterproof coating applied to one of said opposing faces of said first layer;
    a second layer of natural wood fiber paperboard having opposing faces; and
    a moisture resistant coating applied to one of said opposing faces of said second layer; wherein:
    the first layer of natural wood fiber paperboard consists of natural wood fibers;
    said first layer and said second layer are laminated together; and
    the face of the first layer having the waterproof coating and the face of the second layer having the moisture resistant coating are the outermost surfaces of the laminated paperboard.

8. The food tray as recited in claim 7, wherein said food tray is formed in a generally square shape.

9. The food tray as recited in claim 7, wherein said food tray is formed in a generally rectangular shape.

10. The food tray as recited in claim 7, wherein said food tray is formed in a generally circular shape.

11. The food tray as recited in claim 7, wherein said food tray is formed with a single compartment.

12. The food tray as recited in claim 7, wherein said food tray is formed with a multiple compartments.

13. The food tray as recited in claim 12, wherein said food tray is formed with a multiple compartments having the same size.

14. The food tray as recited in claim 12, wherein said food tray is formed with a multiple compartments having different sizes.

15. The food tray as recited in claim 12, wherein said food tray is formed with a multiple compartments having the same shape.

16. The food tray as recited in claim 12, wherein said food tray is formed with a multiple compartments having the same shape.

17. The laminated paperboard as recited in claim 1, wherein the first and second layer of natural wood fiber paperboard consist of a hardwood fiber, a softwood fiber, or a combination thereof, and the laminated paperboard comprises 94wt % to 96wt % of the overall weight of the laminated paperboard.

18. The laminated paperboard as recited in claim 17, wherein the waterproof coating comprises polyethylene in an amount of from 2.9wt % to 3.3wt % of the overall amount of the laminated paperboard.

19. The laminated paperboard as recited in claim 18, wherein the moisture resistant coating is a water based acrylic coating.

20. The laminated paperboard of claim 19, wherein a polyvinyl acetate adhesive adheres a portion of the first layer of natural wood fiber paperboard to a portion of the second layer of natural wood fiber paperboard.

21. The laminated paperboard of claim 1, wherein the first layer and second layer remain visually distinguishable when viewed in cross-section after the first layer and second layer are laminated together to form the laminated paperboard.

\* \* \* \* \*